United States Patent
Schnoblen et al.

(10) Patent No.: US 7,401,840 B2
(45) Date of Patent: Jul. 22, 2008

(54) WINDOW SHADE

(75) Inventors: David A. Schnoblen, Sterling Heights, MI (US); Bruce B. Bober, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/430,349

(22) Filed: May 9, 2006

(65) Prior Publication Data

US 2007/0262606 A1 Nov. 15, 2007

(51) Int. Cl.
*B60J 7/00* (2006.01)
(52) U.S. Cl. ............ 296/143; 296/97.8; 160/370.22
(58) Field of Classification Search ............ 296/143, 296/97.8, 97.6, 97.7; 160/370.22, 168.1 R, 160/84.4
See application file for complete search history.

(56) References Cited

U.S. PATENT DOCUMENTS

| | | | | | |
|---|---|---|---|---|---|
| 1,892,087 | A | * | 12/1932 | Stuber | 160/277 |
| 4,179,155 | A | * | 12/1979 | Ortiz | 296/97.6 |
| 4,458,739 | A | * | 7/1984 | Murray et al. | 160/23.1 |
| 4,869,542 | A | * | 9/1989 | Lin | 296/97.8 |
| 4,898,224 | A | * | 2/1990 | Woodworth | 296/97.8 |
| 4,932,711 | A | * | 6/1990 | Goebel | 296/97.8 |
| 5,089,912 | A | * | 2/1992 | Simin | 296/97.8 |
| 5,098,149 | A | * | 3/1992 | Lee | 296/97.8 |
| 5,495,884 | A | * | 3/1996 | Shikler | 296/97.8 |
| 5,605,370 | A | * | 2/1997 | Ruiz | 296/97.8 |
| 6,039,107 | A | * | 3/2000 | Pittard | 160/370.22 |
| 6,079,474 | A | * | 6/2000 | Lin | 160/370.22 |
| 6,086,133 | A | * | 7/2000 | Alonso | 296/97.8 |
| 6,347,775 | B1 | * | 2/2002 | Edlinger | 296/146.2 |
| 6,460,593 | B1 | * | 10/2002 | Floyd | 160/370.22 |
| 6,691,762 | B2 | * | 2/2004 | Huang | 160/370.22 |
| 6,910,518 | B2 | * | 6/2005 | Zimmermann et al. | 160/370.22 |
| 6,968,887 | B2 | * | 11/2005 | Hansen et al. | 160/370.22 |
| 7,082,983 | B2 | * | 8/2006 | Coulibaly et al. | 160/306 |
| 7,121,610 | B2 | * | 10/2006 | Nguyen | 296/97.8 |
| 2001/0022218 | A1 | * | 9/2001 | Schlecht et al. | 160/370.22 |
| 2003/0141025 | A1 | * | 7/2003 | Schlecht et al. | 160/370.22 |
| 2004/0012225 | A1 | * | 1/2004 | Schlecht et al. | 296/143 |
| 2004/0226669 | A1 | * | 11/2004 | Webb | 160/299 |
| 2006/0219372 | A1 | * | 10/2006 | Hansen | 160/370.22 |
| 2006/0260770 | A1 | * | 11/2006 | Gradl | 160/370.22 |
| 2007/0068638 | A1 | * | 3/2007 | Puskarz et al. | 160/370.22 |
| 2007/0187977 | A1 | * | 8/2007 | Mollick et al. | 296/97.8 |

OTHER PUBLICATIONS

Attachment 1A, Photograph Audi A6 Rear Door, 2004/2005 model year.
Attachment 1B, Photograph BMW X5, 2001 model year.
Attachments 2A & 2B, Photograph 2005 Cadillac DeVille Rear Door.

* cited by examiner

*Primary Examiner*—Kiran B. Patel

(57) ABSTRACT

A window shade is stored on a storage roller mounted beneath a vehicle window opening. A trim panel has a slot through which the window shade may be unwound and raised to a use position shading the window. One or more hooks are attached to the window shade to engage with mating hook retainers at the top of the window opening to retain the window shade in its raised position. The lowered position of the window shade is established by the hook being engaged with a corresponding hook retainer on the trim panel. A finger grip is pivotally mounted on the upper end of the window shade so that the finger grip can have a predetermined pivotal position corresponding to the lowered position of the window shade and a different pivotal position when the window shade is in the raised position.

17 Claims, 4 Drawing Sheets

WINDOW SHADE

FIELD OF THE INVENTION

The present invention relates to a window shade for a vehicle window.

BACKGROUND OF THE INVENTION

It is known in vehicles, particularly in the rear door window, to provide a window shade that the occupant may deploy to overlie the inside of the window panel. The window shade may be used to limit the intrusion of the sun into the vehicle or to provide privacy for the vehicle occupant. Such window shades are fashioned of a flexible material such as cloth, vinyl or plastic that is either opaque or translucent. A storage roller is mounted on the vehicle door adjacent the lower edge of the window opening. The storage roller is preferably concealed beneath a trim panel of the vehicle and the window shade can be deployed by lifting the top edge of the window shade upwardly as permitted by unrolling of the flexible window shade material from the storage roller. The window shade is retained in its raised position by having a hook or hooks mounted on the top edge of the window shade for engagement into a mating hook retainer or hook retainers provided at the top of the window opening.

In order to facilitate the raising of the window shade by the occupant, a handle is fixedly attached to the top edge of the window shade and projects towards the seated occupant to be gripped by the occupant. The handle also serves as a stop to limit the lowering movement of the window shade by having the handle engage with the trim panel at the bottom of the window opening.

SUMMARY OF THE INVENTION

It would be desirable to provide a new and improved window shade which can be better packaged within the vehicle and having a more aesthetically pleasing and more functional design.

Thus, according to the invention, a window shade is stored on a storage roller mounted on the vehicle beneath the window opening. A trim has a slot through which the window shade may be unwound from the storage roller and raised to a use position shading the window. One or more hooks are attached to the upper end of the window shade to engage with mating hook retainers provided at the top of the window opening to thereby retain the window shade in its raised position. The lowered position of the window shade is established by the hook attached to the upper end of window shade engaging with a hook retainer that is provided on the trim panel. A finger grip is mounted on the upper end of the window shade for use by the occupant to raise and lower the window shade. The finger grip is pivotally mounted on the window shade so that the finger grip can have a predetermined pivotal position corresponding to the lowered position of the window shade and a different pivotal position when the window shade is in the raised position.

Further areas of applicability of the present invention will become apparent from the detailed description provided hereinafter. It should be understood that the detailed description and specific examples, while indicating exemplary embodiments of the invention, are intended for purposes of illustration only and not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
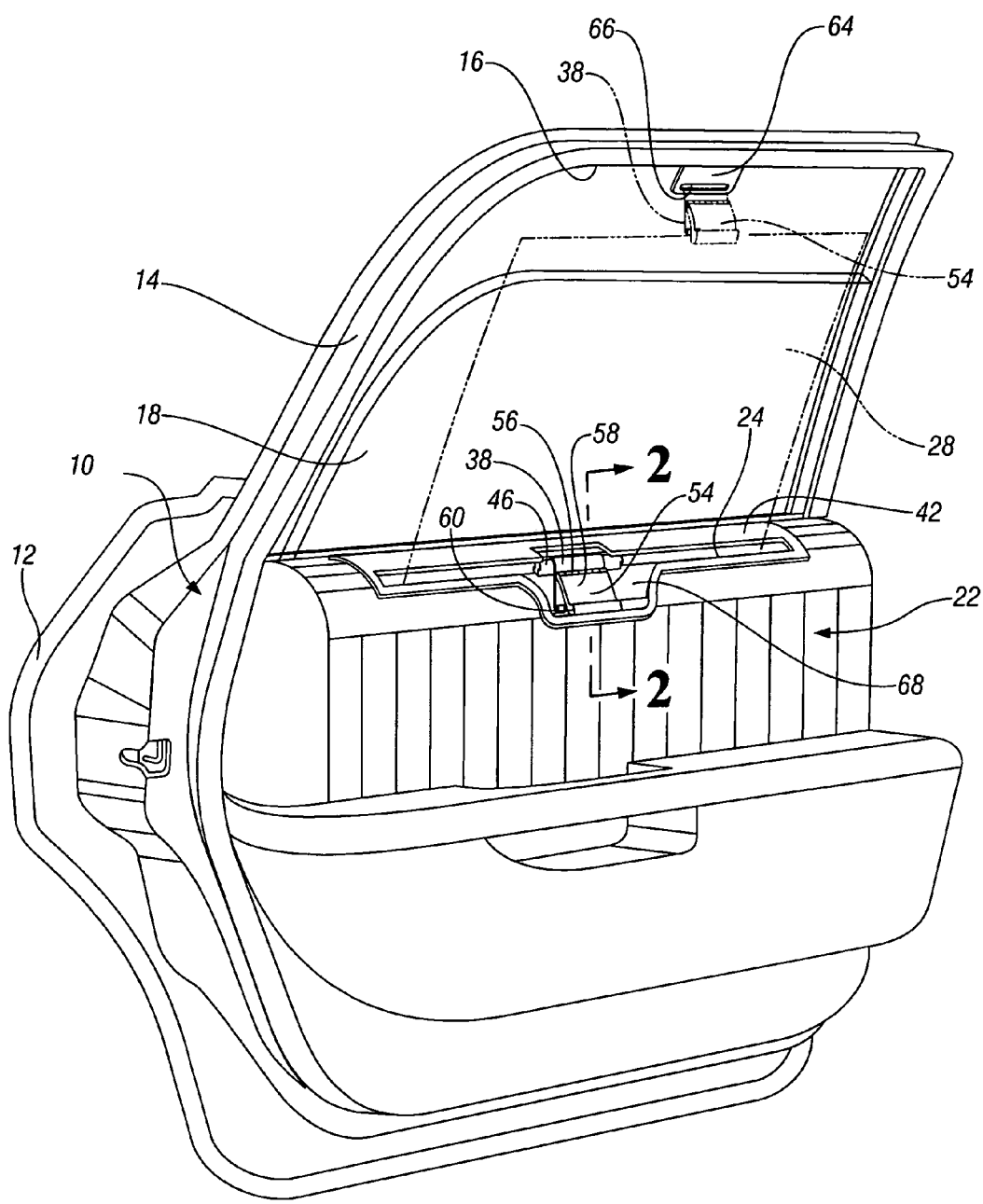
FIG. 1 is a perspective view of a vehicle door having the window shade of this invention shown in the lowered position, and the raised position of the window shade shown in phantom lines.

Referring to FIG. 1, a vehicle door generally indicated at 10 is conventionally constructed and includes an outer panel 12 of sheet metal and a window frame 14 that defines a side window opening 16. A window panel 18 is mounted within the door 10 by a conventional window regulator mechanism by which the window panel 18 may be raised and lowered.

Figure 2:
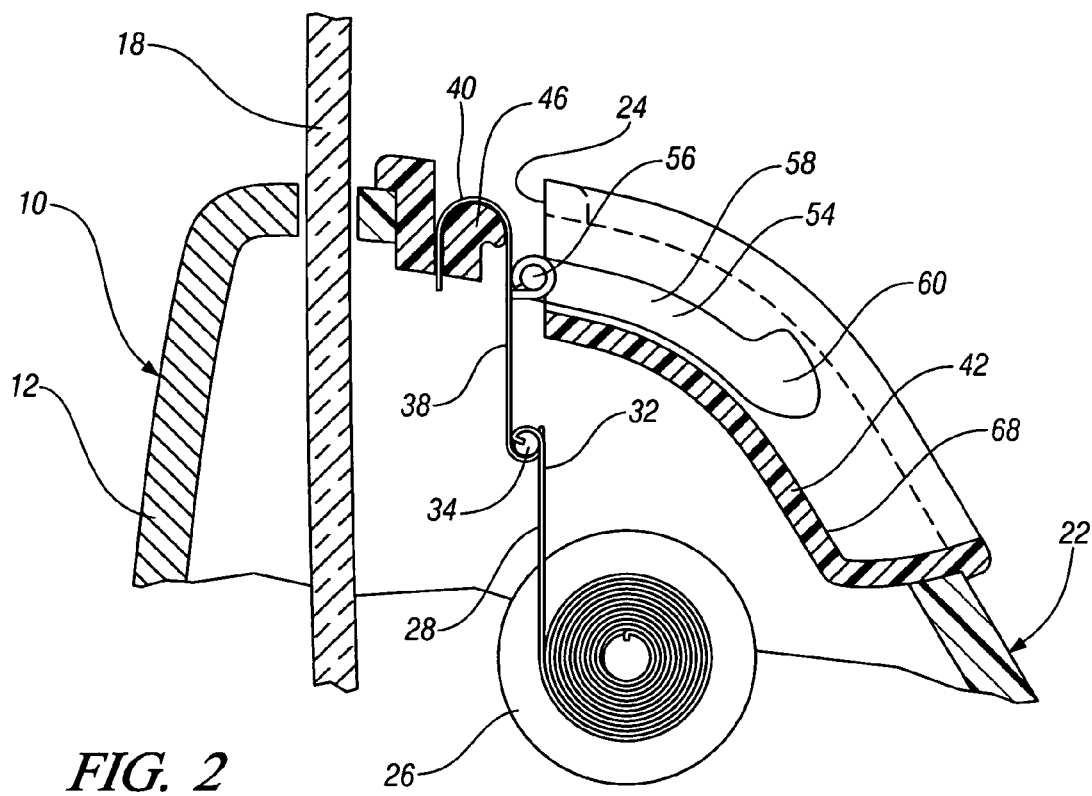
FIG. 2 is a section view taken in the direction of arrows 2-2 of FIG. 1 and showing the window shade in the lowered position.

As seen in FIGS. 1 and 2, the interior of the door 10 is trimmed and made aesthetically pleasing by a trim panel assembly, generally indicated at 22, and having a window shade slot 24 formed therein. Such inner door trim assemblies 22 are conventionally manufactured of a rigid substrate material such as molded plastic, fiber board or metal which may be covered with a vinyl, leather, or cloth trim material.

Referring to FIG. 2, a window shade storage roller 26 is mounted on the door 10 and has a flexible window shade 28 stored thereon. As seen in FIG. 1, the window shade 28 preferably extends along a substantial portion of the length of the window opening 16 of the vehicle door 10. The window shade 28 is a flexible material, such as cloth, vinyl or plastic, and may be either translucent or opaque. The window shade 28 is sized to overlie all or part of the window panel as desired.

The top edge 32 of the window shade 28 has a stiffening rod 34 captured therein to stiffen the flexible material of the window shade 28 along its top edge 32. As seen in FIG. 2, a hook 38 of either metal or molded plastic construction is attached to the top edge 32 of the window shade 28 via the stiffening rod 34. The hook 38 includes a hook portion 40 that is bent in a downward and outward direction.

The trim panel assembly 22 includes a trim bezel 42, which is shown as a separately molded component that is attached to the door trim assembly 22, but may be molded integrally with the trim panel assembly 22. As seen in FIG. 2, the trim bezel 42 includes a hook retainer 46 that is engaged by the hook portion 40 of hook 38 to establish the lowered position of the window shade 28. In particular, as shown in FIG. 2, the stored position of the window shade is such that the stiffening rod 34 has been retracted through the slot 24 provided in the trim bezel 42 so that the window shade 28 is completely concealed from view beneath the door trim assembly 22. In addition, FIG. 2 shows that the elevation of the hook retainer 46 of the trim bezel 42 is such that the top of the hook 38 is flush with or slightly below the upper margin of the trim panel assembly 22 so that the hook 38 is not obtrusively visible to a person either inside or outside the vehicle. In addition, FIG. 2 shows that the hook 38 faces away from the interior of the vehicle and the hook retainer 46 is located on the outboard side of window shade 28.

Referring again to FIGS. 1 and 2, it is seen that a finger grip 54, of molded plastic construction, is pivotally mounted on the hook 38 by a pivot pin 56. The finger grip 54 includes a stem 58 having a knob 60 at the end thereof. As seen in FIGS. 1 and 2, the finger grip 54 lies within a recess 68 provided on the trim bezel 42 so that the finger grip 54 is aesthetically housed within the pocket formed by the recess 68 and yet is readily available to be gripped by the vehicle occupant. When the vehicle occupant wishes to shade the window panel 18, the knob 60 of the finger grip 54 is gripped and the finger grip 54 is then raised upwardly to unwind the window shade 28 from the storage roller 26 to the phantom line indicated position of FIG. 1.

As seen in FIG. 1, a hook retainer 64 is attached to the window frame 14 and has a slot 66 for receiving the hook portion 40 of hook 38. The hook 38 is inserted into the slot 66 of the hook retainer 64 to retain the window shade 28 at its raised position as shown in phantom lines in FIG. 1. When the occupant releases the finger grip 54, gravity causes the finger grip 54 to pivot down to hang in a vertical depending position so as not to intrude into the occupant space, and yet remain readily available for gripping by the vehicle occupant when it is desired to unhook the hook 38 from the hook retainer 64 and return the window shade 28 to its lowered position.

Figure 3:
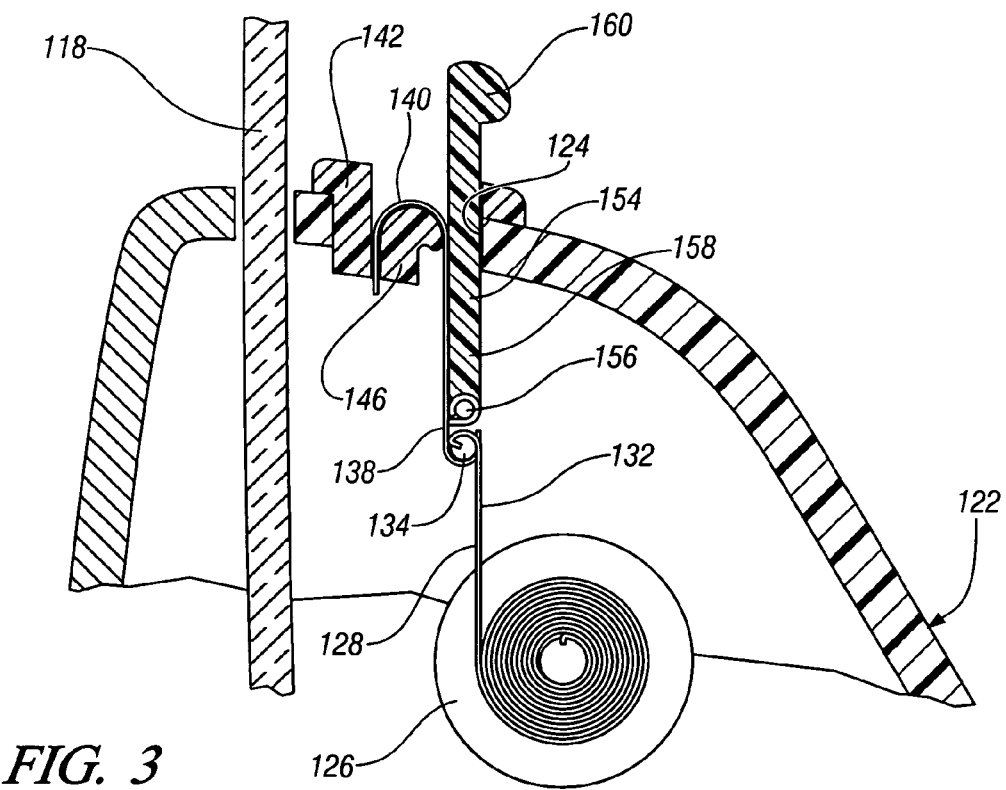
FIG. 3 is a view similar to FIG. 2 but showing a second embodiment of the invention.
Figure 4:
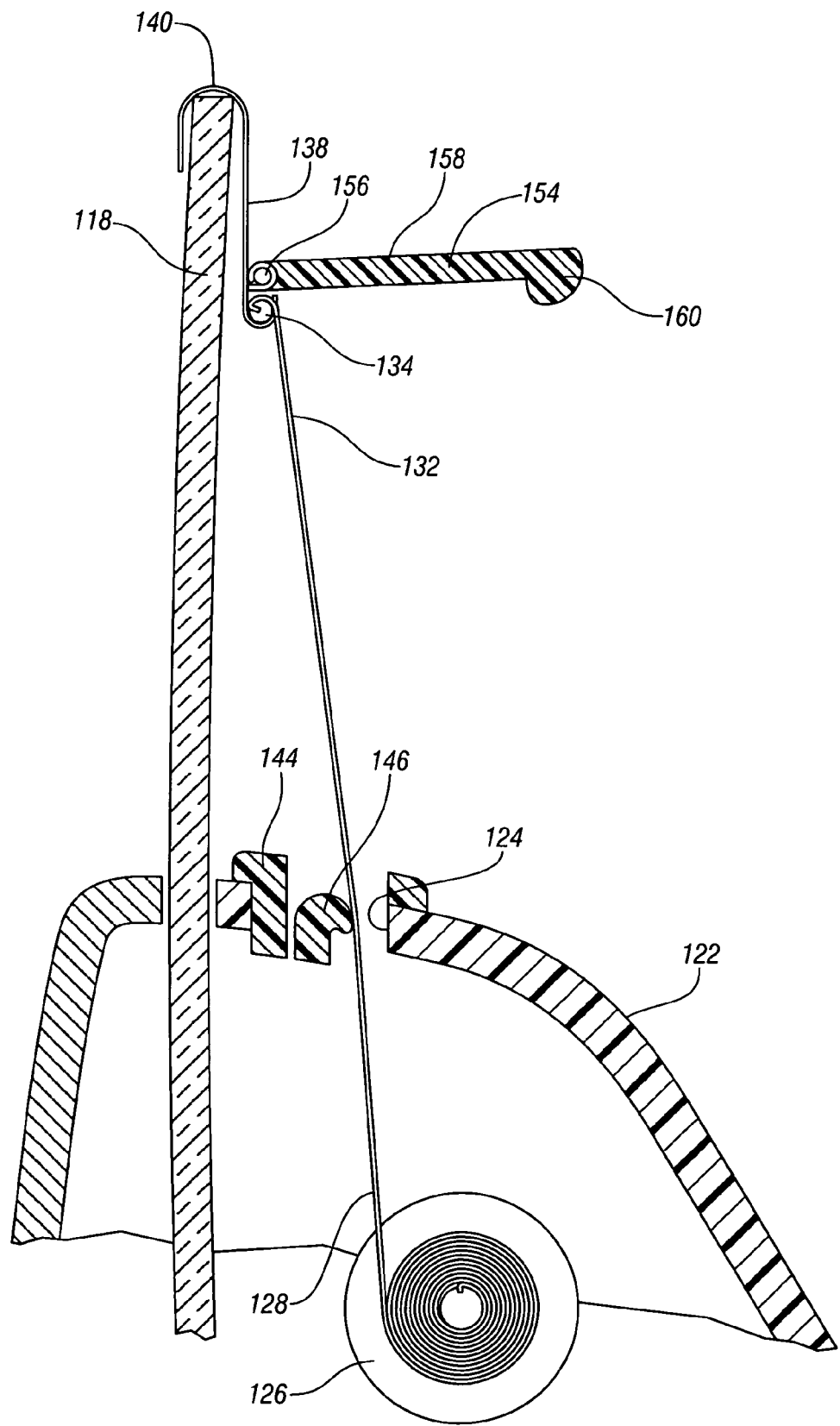
FIG. 4 is a view similar to FIG. 3 except showing the window shade in its raised position; and, FIG. 5 is a view similar to FIG. 4 showing a third embodiment of the invention.

Referring to FIGS. 3 and 4, a second embodiment of the invention is shown in which the window shade 128 is stored upon a storage roller 126 that is concealed beneath a trim panel assembly 122. A stiffening rod 134 is provided at the upper edge 132 of the window shade 128 and a hook 138 is attached to the stiffening rod 134. The hook 138 has a hook portion 140 that engages with a hook retainer 146 of a trim panel 142 to establish the lowered position of the window shade 128. A finger grip 154 is pivotally attached to the hook 138 and includes a stem 158 and a knob 160. As seen in FIG. 3, the finger grip 154 has a generally upright position in which the lower end of the stem 158 is concealed beneath the door trim panel assembly 122 but the knob 160 projects upwardly above the surface above the trim panel assembly 122 to be readily accessible to the vehicle occupant.

The vehicle occupant may grip the knob 160 in FIG. 3 and thereby lift the finger grip 154 to raise the window shade 128 to its raised position of FIG. 4 in which the hook portion 140 of hook 138 has been engaged over the top edge of the window panel 118. Thus, as the window panel 118 is raised and lowered by the window regulator, the window shade 128 will be automatically raised and lowered in conjunction with the window panel 118. As seen in FIG. 4, the pivot pin 156 which mounts the finger grip 154 on the hook 138 has permitted the finger grip 154 to pivot downwardly to a predetermined position where the finger grip 154 is ready for subsequent gripping by the vehicle occupant when it is desired to unhook the hook 138 from the window panel 118 and lower the window shade 128 to its stored position of FIG. 3. As the window shade 128 approaches its fully lowered position, stiffening rod 134 passes through slot 124 in the trim panel assembly 122 to be concealed beneath the trim panel assembly 122, and the stem 158 of the finger grip 154 comes into engagement with the door trim assembly 122 and causes the finger grip 154 to pivot upwardly to the stored position of FIG. 3 in which the knob 160 of finger grip 154 can be readily gripped by the occupant. The window shade 128 may also be disengaged or unhooked from the window panel 118 if the window panel is completely lowered into the door 10.

Figure 5:
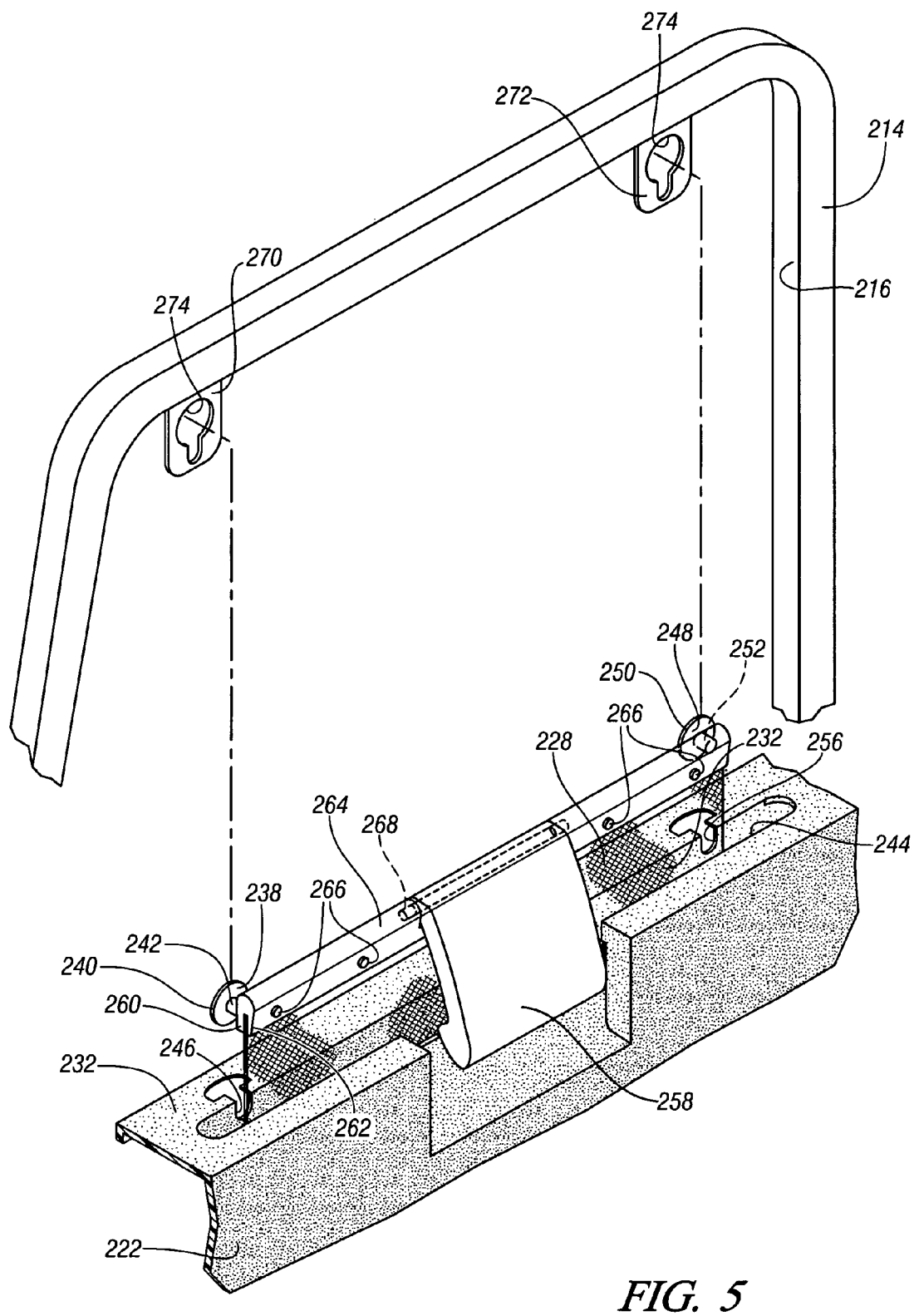

FIG. 5 shows a third embodiment of the invention. A window shade 228 has a top edge 232 that is captured between legs 260 and 262 of a stiffener rod 264 of molded plastic. A plurality of heat staked rivets 266 extend between the legs 260 and 262 to attach the stiffener rod 264 to the window shade 228. At its forward end, the stiffener rod 264 has an integrally molded hook 238, including a head 240 and a shank 242. The window trim panel assembly 222 has slot 244 through which the window shade 228 is raised and lowered, and a retainer slot 246 provided on the outboard wall of the slot 244 that captures the shank 242 when the window shade 228 is lowered in order to establish the lowered position of the window shade 228. A similar integrally molded hook 248, including a head 250 and shank 252, is integrally molded to the rear end of the stiffening rod 264 and fits into a mating retainer slot 256 provided on the trim panel assembly 222. The depth of the retainer slots 246 and 256 is preferably such that the stiffening rod 264 is established in a lowered position that is either flush with the top of the door trim assembly 222, or recessed below the door trim assembly 222, so as to provide an aesthetically pleasing appearance.

A finger grip 258 is pivotally mounted on the stiffening rod 264 by a pivot pin 268. Retainers 270 and 272, each having a key-hole shaped slot 274, are provided on the window frame 214 at the top of the window opening 216 to receive the hooks 238 and 248 when the window shade 228 is raised.

The foregoing description of the invention is merely exemplary in nature and, thus, variations thereof are intended to be within the scope of the invention. For example, although the embodiment of FIGS. 1 and 3 shows only a single hook attached to the top edge of the window shade, it may be desirable to provide a pair of hooks that would be located respectively at the front corner and rear corner of the window shade as in FIG. 5, with each hook engaged within its own hook retainer at the top of the window frame 16. This use of front and rear hooks may provide more stability for the raised and lowered positions of the sunshade.

Furthermore, it may be desirable to have more than one of the pivoted finger grips. For example, the use of two of the pivoted finger grips may be desirable for two-handed raising and lowering of the window shade when the window shade is of considerable length, as in the case of a sunshade for shading a large window panel in a rear area of a van-type vehicle. However, a single finger grip located at the center of the window shade may be most desirable to enable one handed raising and lowering of the window shade. The finger grip may be suitably pivotally connected directly to the window shade stiffening rod by an extension or bracket which would pivotally mount the finger grip to the top edge portion of the window shade, thereby enabling the finger grip to pivot between a stored position when the window shade is raised and a different stored position when the window shade is lowered. Or, alternatively, as shown herein, the finger grip can be pivotally connected to the hook and the hook in turn connected to the window shade by the stiffening rod. Or the finger grip can be pivotally connected directly to the stiffening rod of the window shade. The pivotal position of the finger grip can be established by gravity, or by a spring acting on the finger grip.

The stiffening rod may be attached to the window shade using any known fastening technique, such as sewing, rivets, screws, heatstaking, snap fasteners, sonic welding, etc. In addition, it will be recognized that the shape of the hook, the hook retainer on the trim panel, and the hook retainer on the window frame can be chosen from the many examples of hooks and retainers that are known to skilled engineers. Furthermore, although the drawings show an installation in which the window shade unit is integrated into the vehicle by the vehicle manufacturer, the window shade roller can also be housed within a separate trim panel unit that is designed to be attached over top the original equipment trim panel, as would be convenient for retrofitting the window shade kit to vehicles in the aftermarket.

The window shade is not limited to use on vehicle side doors, but can be used with other vehicle windows, such as the fixed windows on either the rear or side of a vehicle. Thus, the hook retainer that is mounted above the window opening can be mounted on the part of the door that frames the window opening, or mounted on the fixed part of the vehicle body that frames the window opening.

In carrying out the invention, the vehicle manufacturer may mount the window shade roller on the trim panel 22 or on either the vehicle structure or door structure that underlies the trim panel 22.

Thus, an engineer of ordinary skill will recognize that other mounting details may be employed in order to attach the hook to the top edge of the window shade, provide a hook retainer on the trim panel assembly, and provide for the pivotal mounting of the finger grip in relation to the window shade and hook.

What is claimed is:

1. A window shade for a window of a vehicle, comprising:
    a window shade storage roller mounted beneath a window opening;
    a trim panel concealing the storage roller and having a slot therein;
    a window shade wound on the roller and having a stiffening rod at the top edge adapted for movement between a lowered position and a raised position;
    a first hook element carried on the stiffening rod at the top edge of the window shade and facing away from the vehicle occupant;
    a second hook element provided on the trim panel on the side of the slot facing away from the vehicle occupant and being engaged by the first hook element when the window shade is lowered so that the engagement between the first hook element and the second hook element establishes the lowered position of the window shade in which the stiffening rod at the top edge of the window shade is retracted through the slot in the trim panel to be concealed from view; and
    a finger grip carried by the top edge of the window shade for use by a vehicle occupant to move the window shade between the raised and lowered positions.

2. The window shade of claim 1 in which the second hook element is located below the top surface of the trim panel.

3. The window shade of claim 1 in which the second hook element is a molded portion of the trim panel.

4. The window shade of claim 1 in which the finger grip is pivotally connected to the window shade for pivotal movement.

5. The window shade of claim 4 in which the finger grip engages with the trim panel when the window shade is lowered to pivot the finger grip to a stored position in which the finger grip is readily accessible for gripping by the vehicle occupant.

6. The window shade of claim 5 in which the trim panel has a recess in which the finger grip is engaged when the widow shade is lowered so that the finger grip is pocketed within the recess and readily accessible for gripping by the occupant.

7. The window shade of claim 4 in which the finger grip pivots to a predetermined position when the window shade is in the raised position so that the finger grip is readily accessible for gripping by the vehicle occupant.

8. The window shade of claim 1 in which the window opening is closed by a movable glass and the first hook element can be engaged over the edge of the glass to retain the window shade at the raised position.

9. The window shade of claim 1 in which upon engagement of the first hook element hook with the second hook element, the first hook element does not project above the height of the trim panel.

10. The window shade of claim 1 in which the finger grip includes a stem pivoted to the window shade and a knob for gripping by the occupant, and the trim panel allows the stem of the finger grip to enter into the slot and the finger grip is pivoted by engagement of the stem with the trim panel to pivot the finger grip to a generally vertical position in which the knob is poised above the slot for ready access by the occupant.

11. The window shade of claim 1 in which the finger grip is pivotally mounted at the top of the window shade and pivots between a first position when the window shade is in the lowered position and a second position when the window shade is in the raised position.

12. The window shade of claim 1 in which an additional hook retainer is mounted on the vehicle above the window opening and is engaged by the first hook element to retain the window shade in the raised position.

13. The window shade of claim 1 in which the first hook element is comprised of hook elements at the front and rear of the window shade, and corresponding second hook elements are provided on the trim panel opposite each of the first hook elements.

14. A window shade for a window of a vehicle, comprising:
    a window shade storage roller mounted beneath a window opening;
    a trim panel concealing the storage roller and having a slot therein;
    a window shade wound on the roller and having a stiffening rod at the top edge adapted for movement between a lowered position and a raised position;
    a first hook element carried on the stiffening rod at the top edge of the window shade and facing away from the vehicle occupant;
    a second hook element provided on the trim panel on the side of the slot facing away from the vehicle occupant and being engaged by the first hook element when the window shade is lowered so that the engagement therebetween establishes the lowered position of the window shade in which the stiffening rod at the top edge of the window shade is retracted through the slot in the trim panel to be concealed from view; and
    a finger grip pivotally carried by the top edge of the window shade for use by a vehicle occupant to move the window shade between the raised and lowered positions, said finger grip being pivotal between a first pivoted position engaging with the trim panel when the window shade is lowered to pivot the finger grip to a stored position in which the finger grip is readily accessible for gripping by the vehicle occupant, and a second pivoted position readily accessible for gripping by the vehicle occupant when the window shade is in the raised position and the occupant ungrips the finger grip.

15. The window shade of claim 14 in which the finger grip includes a stem pivoted to the window shade and a knob for gripping by the occupant, and the trim panel allows the stem of the finger grip to enter into the slot and the finger grip is pivoted by engagement of the stem with the trim panel to pivot the finger grip to a generally vertical position in which the knob is poised above the slot for ready access by the occupant.

16. The window shade of claim 14 in which the trim panel has a recessed pocket provided on the surface thereof and the finger grip is engaged within the recessed pocket to establish the finger grip in position for ready access by the occupant.

17. The window shade of claim 14 in which first hook elements are provided at the front and rear ends of the window shade, and corresponding second hook elements are provided on the trim panel opposite each of the first hook elements.

* * * * *